Patented Nov. 20, 1928.

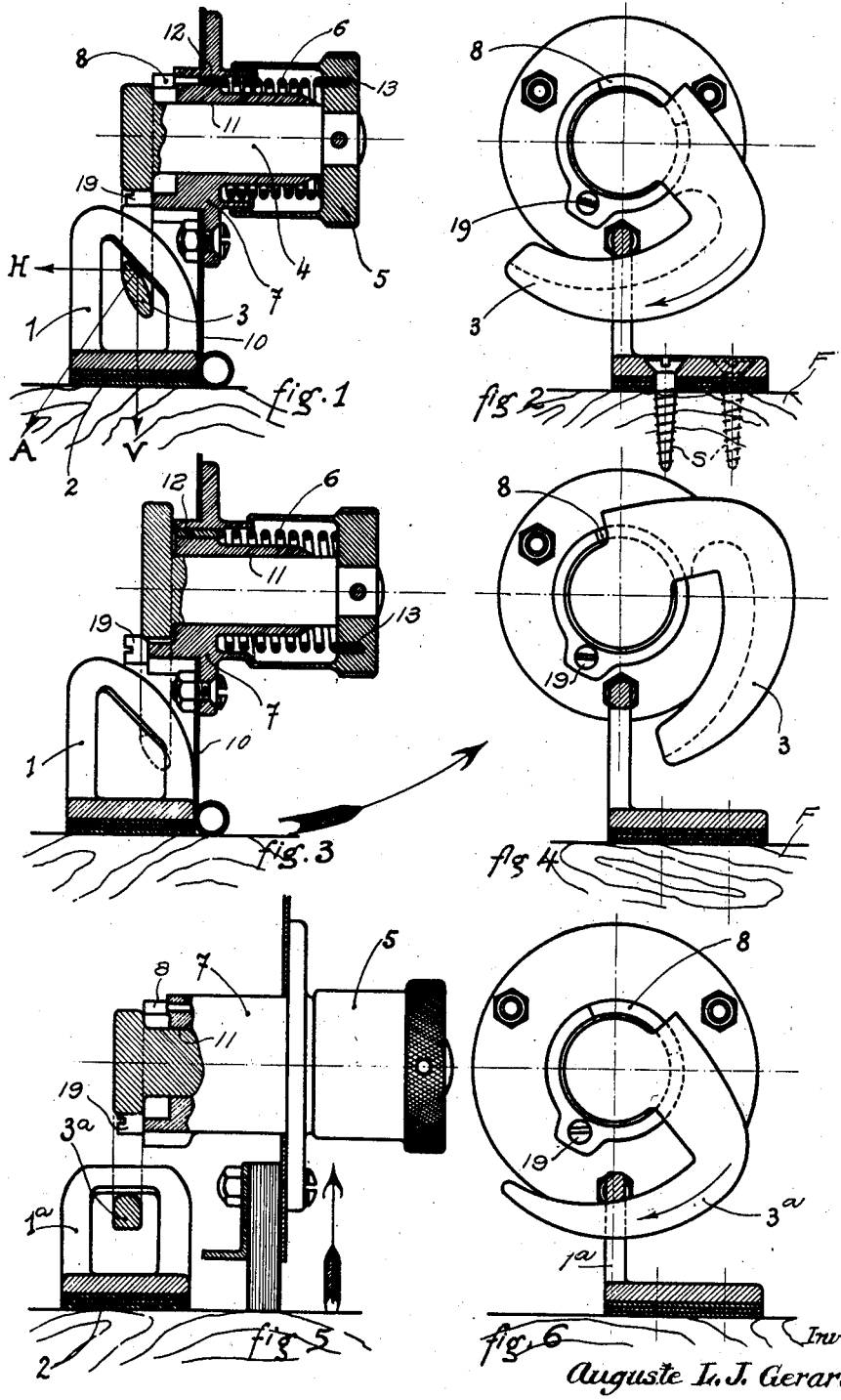

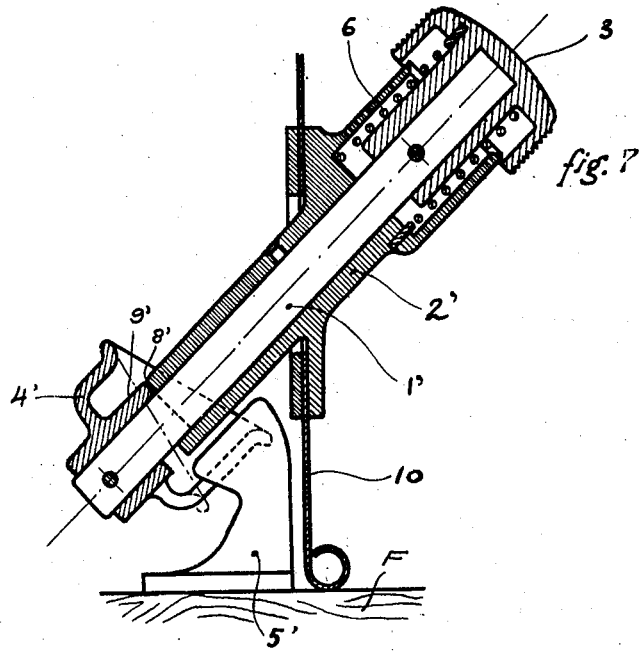
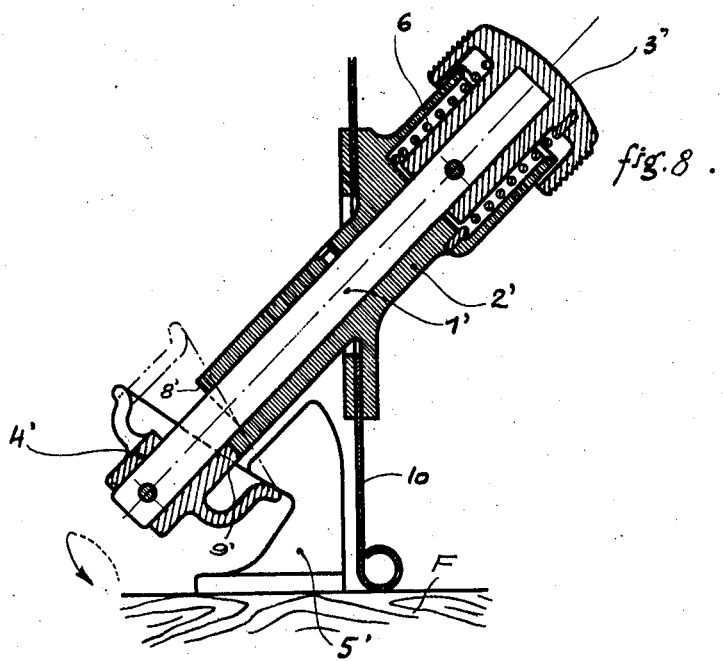

1,692,295

UNITED STATES PATENT OFFICE.

AUGUSTE LÉON JEAN GÉRARD, OF PARIS, FRANCE.

AUTOMATIC FASTENING DEVICE.

Application filed November 30, 1926. Serial No. 151,788.

The present invention relates to latching or fastening devices especially intended for the engine hood of automobiles and the like having for its primary object to provide a fastener wherein the engaging and disengaging action is mostly automatic thereby assuring a positive fastener while greatly reducing the length of time generally spent in securing or freeing the hood.

A further object of the invention resides in the provision of a rotatable fastener adapted upon a slight rotary movement to be automatically urged and held in disengaging position, and capable of automatically returning to engaging position when released.

It is also amongst the desirable features of the invention to provide a hood fastener continuously urged into further engagement whereby, upon vibration of the hood occasioned by the motor or the road, the fastening connection automatically tightens, thus preventing rattling and accidental disengagement of the fastener.

Other important objects and advantages of the invention will be in part obvious and in part pointed out hereinafter.

In order that the invention and its mode of operation may be fully understood by those skilled in the art, I have in the accompanying drawings, set out the preferred embodiment thereof.

In these drawings:

Figure 1 is a vertical cross section through my improved fastener shown in engaging position, Figure 2 is an end elevation of the same, Figure 3 is a vertical cross section of the fastener shown in disengaging position, Figure 4 is an end thereof, Figure 5 is a side elevation of the device illustrating a slight modification, especially adapted to be used with vertically closing hoods, Figure 6 is an end view of the same, Figure 7 is a vertical cross section of a further modification of the invention illustrating the same in disengaging position, and Figure 8 is a similar view, the device being in engaging position.

Having more particular reference to the drawings wherein like characters of reference will designate corresponding parts throughout, a keeper 1 is vertically mounted on portions F of an automobile frame adjacent the resting portion of the hood 10 and rigidly secured thereon by means of screws S or the like. The keeper 1 which may be adjusted at a suitable height by means of washers 2, preferably has an upper downwardly slanting portion, as shown in Figures 1 and 3, offering a cam surface for the purpose later specified.

Secured adjacent the lower free edge of the hood 10 and horizontally extending therethrough is a sleeve member 7, provided with a longitudinal central opening 11.

Received within the opening 11 of the sleeve 7 and free to rotate therein is a shank 4 having a cap or knob member 5 fixed to the outer end thereof and a curved hook 3 rigidly secured to its opposite end, said hook adapted to be brought into and out of engagement with the keeper 1.

The engaging portion of the curved hook 3 is preferably tapered towards its inner lower edge whereby to provide a cam surface cooperating with the cam surface of the keeper.

Because of this construction of the cooperating hook and keeper it will be understood that a further engagement of the hook 3 within the keeper 1 will result in a tighter connection therebetween.

Should my improved fastening device be used on vertically closing hoods I preferably employ a keeper 1ª of substantially rectangular formation as more clearly shown in Fig. 5 likewise, I eliminate the tapered engaging surface of the curved hook 3ª and provide a slightly rounded surface whereby to effect a positive engaging action of the hook and keeper.

With a view towards providing an automatic operation of my improved engaging device a suitable coil spring 6 mounted to normally urge the hook into fastening position is retained about the shank engaging portion of the sleeve 7, one end 12 of said spring being fixed in the bracket 7 while the opposite end 13 engages the knob member 5 rigidly connected to the shank 4.

It will now be understood that the coil spring resting against the fixed sleeve 7 outwardly urges the freely mounted shank 4 carrying therewith the curved hook 3 or 3ª. Likewise, upon rotation of the shank 4 and the hook to disengaging position by means of the knob 5, the spring 6 tends to return said shank and hook to their normal and engaging positions.

The inner end of the fixed sleeve 7 is provided with a notch 9 adapted to receive the curved hook 3 or 3ª when in open or disengaging position. It is obvious that the hook 3 or 3ª being normally urged outwardly by the arrangement of the spring 6, will automatically fall in the notch 8 when said hook is rotated to a point where it completely disengages the keeper 1 or 1ª. The spring 6 also tending to return the hook in its engaging position will force the latter against the adjacent shoulder of the groove 8 thereby assuring a positive means for holding the hook in open or disengaging position.

A projection 9 is also provided on the inner end of the fixed sleeve 7 preferably diametrically opposite the groove 8 for the purpose of limiting the inward movement of the hook 3 or 3ª.

In the modification of the invention shown in Figs. 7 and 8 a tubular sleeve 2' is rigidly mounted to extend at a suitable angle through the hood 10, and adapted to receive a rotatable shank 1' carrying the handle or knob 3' on its outer end and a circular hook member 4' on its inner end.

Suitably mounted upon portions F of the automobile frame adjacent the resting portion of the hood 10 is a keeper 5 adapted to receive at times the hook member 4' to securely fasten the hood. The outer circumferential surface of the circular hook 4' gradually increases in height from its engaging point whereby a continuous camming or wedging action will be obtained upon further engagement of the hook and keeper.

A coil spring 6' retained within the sleeve 2' about the shank engaging portion of the knob and secured to the fixed sleeve 2' and the rotatable knob 3', serves to automatically operate the hood fastener in the same manner as described hereinbefore.

The circular hook member 4' is retained in open or disengaging position by means of a projection 9' made integral with the upper shank engaging portion of said hood, said projection automatically falling into a notch 8' formed on the inner end of the sleeve 2' upon rotation of the hook to disengaging position.

It will now be fully understood that my improved fastener once in engaging position is securely held therein because of the arrangement and construction of the coil spring 6 or 6'. Furthermore, the hook member being continuously urged into further engaging position, and because of its wedging construction the vibration of the hood or the frame occasioned by the engine or the road will cause the connection between the hook and keeper to tighten thereby preventing rattling of the hood or accidental disengaging of the fastening device.

When it is desired to unfasten the hood, the knob 5 or 3' is slightly rotated, disengaging the hook and bringing it opposite the notch 8 or 8' in which it automatically falls locking the hook in open position.

Upon a slight pressure applied to the knob the hook is disengaged from the notch and automatically returned to fastening position by the action of the coil spring.

Although described in connection with an engine hood, it is obvious that the fastening or latching device may be adapted to many other uses, likewise it is manifest that the construction herein shown and described is capable of considerable modification and such modifications as come within the spirit of my claims, I consider within the scope of my invention.

I claim:

1. A device of the character described comprising in combination with the hood and frame of an automobile, a sleeve fixed to portions of said hood, a handle rotatably mounted within and extending through said sleeve, a curved hook secured to one end of the handle and having a wedging engaging surface, a keeper fixed to the frame and having an inclined surface cooperating with the wedging surface of the hook, and a coil spring engaging the fixed sleeve and the rotatable handle to continuously urge the hook into further wedging engagement with the keeper preventing the hood to move relatively to the frame.

2. A device of the character described comprising a sleeve, a rotatable fastening member retained in the sleeve and having a slanting wedging surface, a keeper for engaging the fastening member and adapted to cooperate with the slanted wedging surface thereof, and spring means cooperating with the sleeve and the fastening members to normally urge the latter into engagement with the keeper and adapted to automatically lock the fastening member into disengaged position upon rotation thereof.

3. A device of the character described comprising a sleeve, a rotatable fastening member retained in the sleeve, a keeper having an inclined surface adapted to engage the fastening member, whereby to produce the wedging action between said member and keeper, and spring means cooperatively associated with the sleeve and fastening member to normally urge the latter into a continuous further engagement with the inclined surface of the keeper, whereby to prevent relative movement of the device.

4. A device of the character described comprising a sleeve, a shank rotatably retained within the sleeve, a hook secured to one end of the shank, said hook having a wedging engaging surface, a keeper having an inclined wedging surface cooperating with the wedging surface of the hook, and a coil spring continuously urging the hook into further wedging engagement with the inclined surface of the keeper.

In witness whereof I have hereunto set my hand.

AUGUSTE LÉON JEAN GÉRARD.